US007623270B2

(12) United States Patent
Gardella et al.

(10) Patent No.: US 7,623,270 B2
(45) Date of Patent: Nov. 24, 2009

(54) METHOD OF PROCESSING A DIGITAL IMAGE BY MEANS OF ORDERED DITHERING TECHNIQUE DESCRIPTION

(75) Inventors: Pier Luigi Gardella, Montanaso Lombardo (IT); Massimiliano Barone, Bresso (IT); Gary Sweet, Bristol (GB); Danilo Pau, Sesto San Giovanni (IT); Stephen Hill, Bath (GB); Simon Goda, Bristol (GB)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 693 days.

(21) Appl. No.: 11/145,021

(22) Filed: Jun. 3, 2005

(65) Prior Publication Data
US 2005/0280871 A1 Dec. 22, 2005

Related U.S. Application Data

(63) Continuation-in-part of application No. PCT/IT2005/000080, filed on Feb. 16, 2005.

(30) Foreign Application Priority Data

Feb. 18, 2004 (EP) ................... 04425101

(51) Int. Cl.
*H04N 1/52* (2006.01)
*H04N 1/405* (2006.01)
*G09G 5/02* (2006.01)

(52) U.S. Cl. .................. 358/3.13; 358/3.16; 358/535
(58) Field of Classification Search ........... 358/3.13, 358/3.16, 535, 536, 1.9, 3.06, 534
See application file for complete search history.

(56) References Cited

U.S. PATENT DOCUMENTS 5,301,269 A 4/1994 Alcorn et al.
5,363,213 A 11/1994 Coward et al.

(Continued)

FOREIGN PATENT DOCUMENTS

EP 0 359 080 3/1990
EP 0 652 671 5/1995

OTHER PUBLICATIONS

B. Lippel, "Accurate Restoration of Intensity Levels into Dither-Quantized TV", Society for Information Display ("SID") International Symposium Digest of Papers, May 17-22, 1992, pp. 259-261, vol. 23, US.

(Continued)

*Primary Examiner*—Thomas D Lee
(74) *Attorney, Agent, or Firm*—Lisa K. Jorgenson; Bryan A. Santarelli; Graybeal Jackson

(57) ABSTRACT

A dither matrix is applied to a high-resolution image to compare the value of each of the pixels that compose it with a threshold value of the matrix and to obtain an output value of the matrix (Dither matrix value) from each comparison. To each pixel value of the image there is applied an algorithm involving simple but displacement operation, namely shifts to the left and shifts to the right. The pixel values of a low-resolution image are output from the applied algorithm.

20 Claims, 6 Drawing Sheets

U.S. PATENT DOCUMENTS 5,495,346 A     2/1996   Choi et al.
5,734,369 A     3/1998   Priem et al.
5,768,411 A *   6/1998   Shu et al. .................... 382/162
6,088,016 A     7/2000   Wilde 2002/0101616 A1 *   8/2002   Shaked et al. .............. 358/3.13

OTHER PUBLICATIONS

PCT International Search Report, from International application no. PCT/IT2005/000080 dated Jun. 2, 2005.

* cited by examiner

|  | 8 to 6 | 8 to 5 | 8 to 4 |
|---|---|---|---|
| $C_1$ | 1 | 0 | 0 |
| $C_2$ | 1 | 1 | 0 |
| $C_3$ | + | + | - |
| $C_4$ | 0 | 0 | 1 |
| $C_5$ | 1 | 0 | 2 |

|  | 8 to 6 | 8 to 5 | 8 to 4 |
|---|---|---|---|
| $n_1$ | 2 | 3 | 4 |
| $n_2$ | 8 | 7 | 4 |
| $n_3$ | 1 | 1 | 0 |
| $n_4$ | 10 | 10 | 8 |
| $n_5$ | 8 | 8 | 4 |
| $n_6$ | 2 | 0 | 0 |
| $n_7$ | 2 | 2 | 2 |
| $n_{10}$ | 63 | 31 | 15 |

Fig. 8

METHOD OF PROCESSING A DIGITAL IMAGE BY MEANS OF ORDERED DITHERING TECHNIQUE DESCRIPTION

PRIORITY CLAIM

This is a continuation-in-part application which claims priority from PCT/IT2005/000080, published in English, filed Feb. 16, 2005, based on European patent Application No. 04425101.5, filed Feb. 18, 2004, which are incorporated herein by reference.

TECHNICAL FIELD

The present invention relates in general to techniques for processing digital images and, more particularly, to a method of obtaining a low-resolution image from a high-resolution image by means of the technique of "ordered dithering".

BACKGROUND

The quality of an image presented on a digital image display device is determined by the chromatic resolution and the spatial resolution of the display device. The chromatic resolution is defined by the number of bits needed to memorize an element of the image (pixel) and the spatial resolution is defined by the number of pixels of the display device. A typical display system, known as "true color", makes it possible to associate with each point of the display device a digital value that directly defines the color to be displayed. For example, the color of a pixel may be represented by a digital value of 24 bits, that is to say, the intensity of each primary color (R, G, B) is represented by 8 bits.

Certain applications require one to convert a digital image of high chromatic resolution into a digital image of a lower resolution, for example, when one wants to utilize a small-size display device and/or wants to utilize a video memory of reduced dimensions for storing the data that define the image. Various known techniques make it possible to obtain quality images even in these cases, notwithstanding the low chromatic resolution actually available, by exploiting the capacity of the human eye to merge the tonal or chromatic values of adjacent pixels to perceive an intermediate tonal value or color. One of these techniques, known as "ordered dithering", makes it possible to represent, for each primary color level of the image, the entire range of intensity values by means of image elements having only one of two possible intensity levels. The choice of one or the other intensity level is made by examining the image with a bidimensional matrix of pre-determined threshold values [dither matrix]: the value of each image element is compared with the corresponding threshold value of the dither matrix to assume one of the two predetermined values on the basis of the outcome of the comparison. The dither matrix is typically a square matrix of size 4×4 or 8×8 that is repeatedly applied to the image to be processed and in such a way as to cover it completely. The same operation is repeated for all the color levels that make up the image.

Various methods are known for putting the techniques of ordered dithering into practice, but all call for the use of complex hardware and/or software systems.

There is thus a strongly felt need for methods that are less demanding as far as hardware and/or software resources are concerned.

SUMMARY

According to one aspect of the present invention, a method processes a starting image having a first chromatic resolution and formed by N×M pixels to generate an output image having a second chromatic resolution that is lower than said first chromatic resolution. The method includes generating first and second dither matrices each including a plurality of threshold values. The threshold values are the same in each matrix but being arranged differently within the matrices. The method further includes repeatedly applying the first and second dither matrices to selected groups of pixels in the starting image to generate corresponding groups of pixels in the output image.

BRIEF DESCRIPTION OF THE DRAWINGS

The invention will be more readily understood from the following detailed description of some of its implementations, said description, which is being given by way of example, makes reference to the drawings attached hereto, of which:

FIG. 8 shows a table of values assigned to the parameters indicated in the block diagram of FIG. 7 according to an embodiment of the present invention.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

As briefly mentioned above, the ordered dithering technique requires each pixel value p of a monochromatic image to be compared with a threshold value t. When p<t, the method puts p=a, otherwise p=b, where a and b are the two available intensity values. The threshold value may be equal for every pixel positions (for example, it could be the arithmetic mean, or an average value of the two values a and b), or could have different values according to the pixel position. In this latter case, i.e. when use is made of a dithering technique depending on the position, the results are better.

Figure 1:
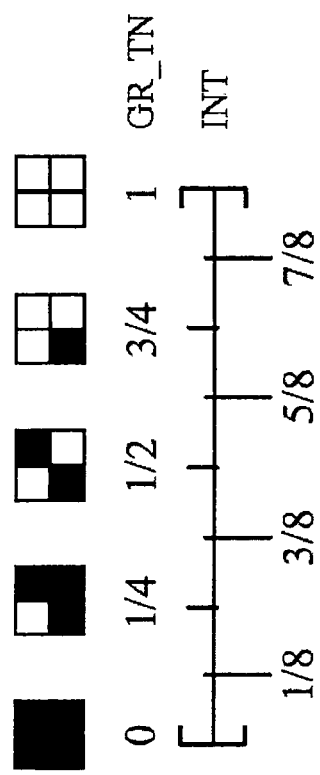
FIG. 1 is a schematic representation that illustrates the configuration of a 2×2 dither matrix.
Figure 2:
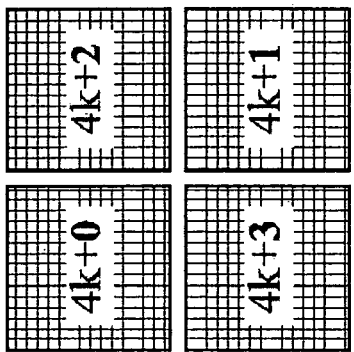
FIG. 2 shows how a 4×4 dither matrix is obtained from the 2×2 dither matrix of FIG. 1.

A uniform area of the image is examined by means of a configuration made up of the two values a and b, which is subsequently shifted until the whole area is covered. For example, referring to FIG. 1, utilizing a configuration formed by 2×2 elements, which may be only white or black, it is possible to simulate five different tones of gray (GR_TN): the field of the possible gray levels, defined between 0 and 1, is divided into five intervals (INT) as shown in FIG. 1. For example, all the gray levels comprised in the interval ⅛-⅜ are represented by the tone ¼ defined by the second configuration from the left. This technique can be put into practice by utilizing a matrix of threshold values that contains a regular configuration of the upper limits of the intervals and defines a threshold for every pixel position. In general, the intervals are equal, so that it is sufficient to define the sequence of the pixel values and arrange them into a dither matrix. As far as the example of FIG. 1 is concerned, the dither matrix is the 2×2 matrix shown in FIG. 2. As a general rule, given an n×n matrix, the values k of the matrix belong to the set of the whole numbers comprised between 0 and $n^2-1$ and the threshold values associated with every value k are obtained from the relationship $(2k+1)/2n^2$. To generate larger dither matrices a recursive method can be used, as shown in FIG. 2, starting from the matrix according to the example of FIG. 1.

Figure 3:
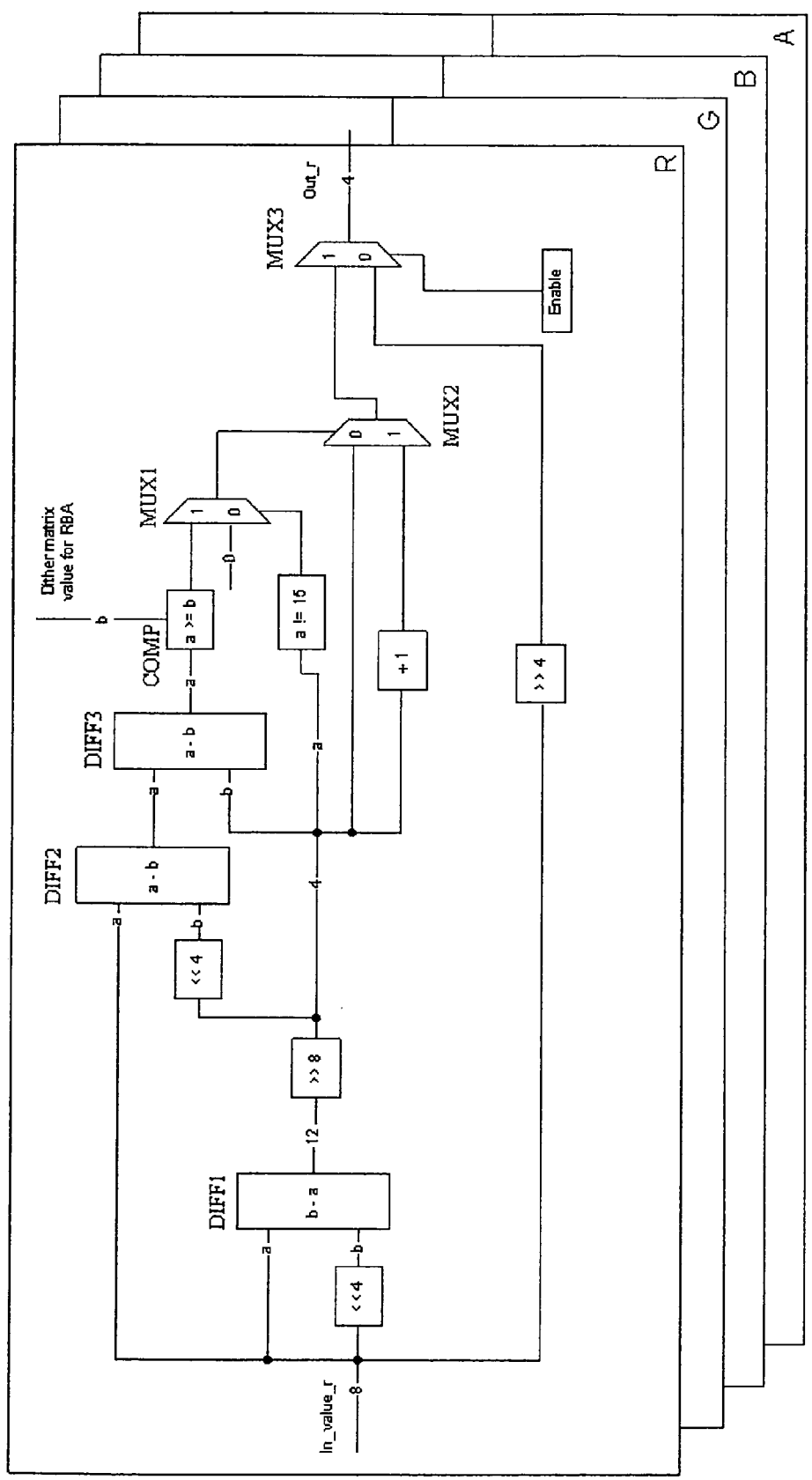
FIGS. 3, 5 and 6 are block diagrams that illustrate three ways of implementing a method in accordance with embodiments of the present invention, FIG. 4 schematically illustrates how the elements of two dither matrices are selected in accordance with the position of the pixels according to an embodiment of the present invention.

Let us consider the implementation form of a method in accordance with an embodiment of the present invention illustrated by FIG. 3. Let us suppose that the image is constituted by three color levels or channels, indicated by RGB (red, green, blue), and by a luminosity (or brightness) level or channel, indicated by A. For each level there is executed the algorithm represented inside the box relating to level R. This algorithm implements the ordered dithering of the image by converting 8-bit intensity input values, indicated by in_value_r, into 4-bit intensity values, indicated by Out_r.

The same dither matrix of n×n elements is utilized for processing the channels RBA. A different dither matrix of n×n elements is used for processing the channel G (green) in order to take account of the different sensitivity of the human eye to the color green. Preferably, n is chosen between 2 and 8.

By way of example, four dither matrices that can be used according to embodiments of the present invention are presented below in tabular form. In the tables:

range=$2^{bit\_in-bit\_out}-1$ (where bit_in and bit_out represent, respectively, the number of input bits and the number of output bits, elements=$dim\_Mtx^2$ (where dim_Mtx represents the dimension of the dither matrix), round represents an operator who rounds off the expression in parentheses to the nearest whole number, and to every pair of position values (Xvalue, Yvalue) there corresponds an element of the matrix RBA and an element of the matrix G.

2×2 dither matrix

| Xvalue | Yvalue | RBA | G |
|---|---|---|---|
| 0 | 0 | 0 | round(range * 2/ elements + 0.5) |
| 1 | 0 | round(range * 2/ elements + 0.5) | round(range * 3/ elements + 0.5) |
| 0 | 1 | round(range * 3/ elements + 0.5) | round(range * 1/ elements + 0.5) |
| 1 | 1 | round(range * 1/ elements + 0.5) | 0 |

3×3 dither matrix

| Xvalue | Yvalue | RBA | G |
|---|---|---|---|
| 0 | 0 | round(range * 7/ elements + 0.5) | round(range * 2/ elements + 0.5) |
| 1 | 0 | round(range * 2/ elements + 0.5) | round(range * 3/ elements + 0.5) |
| 2 | 0 | round(range * 3/ elements + 0.5) | round(range * 0/ elements + 0.5) |
| 0 | 1 | round(range * 0/ elements + 0.5) | round(range * 4/ elements + 0.5) |
| 1 | 1 | round(range * 4/ elements + 0.5) | round(range * 8/ elements + 0.5) |
| 2 | 1 | round(range * 8/ elements + 0.5) | round(range * 5/ elements + 0.5) |
| 0 | 2 | round(range * 5/ elements + 0.5) | round(range * 6/ elements + 0.5) |
| 1 | 2 | round(range * 6/ elements + 0.5) | round(range * 1/ elements + 0.5) |
| 2 | 2 | round(range * 1/ elements + 0.5) | round(range * 7/ elements + 0.5) |

4×4 dither matrix

| Xvalue | Yvalue | RBA | G |
|---|---|---|---|
| 0 | 0 | 0 | round(range * 10/ elements + 0.5) |
| 1 | 0 | round(range * 8/ elements + 0.5) | round(range * 12/ elements + 0.5) |
| 2 | 0 | round(range * 2/ elements + 0.5) | round(range * 4/ elements + 0.5) |
| 3 | 0 | round(range * 10/ elements + 0.5) | round(range * 14/ elements + 0.5) |
| 0 | 1 | round(range * 12/ elements + 0.5) | round(range * 6/ elements + 0.5) |
| 1 | 1 | round(range * 4/ elements + 0.5) | round(range * 3/ elements + 0.5) |
| 2 | 1 | round(range * 14/ elements + 0.5) | round(range * 11/ elements + 0.5) |
| 3 | 1 | round(range * 6/ elements + 0.5) | round(range * 1/ elements + 0.5) |
| 0 | 2 | round(range * 3/ elements + 0.5) | round(range * 9/ elements + 0.5) |
| 1 | 2 | round(range * 11/ elements + 0.5) | round(range * 15/ elements + 0.5) |
| 2 | 2 | round(range * 1/ elements + 0.5) | round(range * 7/ elements + 0.5) |
| 3 | 2 | round(range * 9/ elements + 0.5) | round(range * 13/ elements + 0.5) |
| 0 | 3 | round(range * 15/ elements + 0.5) | round(range * 5/ elements + 0.5) |
| 1 | 3 | round(range * 7/ elements + 0.5) | 0 |
| 2 | 3 | round(range * 13/ elements + 0.5) | round(range * 8/ elements + 0.5) |
| 3 | 3 | round(range * 5/ elements + 0.5) | round(range * 2/ elements + 0.5) |

8×8 dither matrix

| Xvalue | Yvalue | RBA | G |
|---|---|---|---|
| 0 | 0 | round(range * 0/ elements + 0.5) | round(range * 32/ elements + 0.5) |
| 1 | 0 | round(range * 32/ elements + 0.5) | round(range * 8/ elements + 0.5) |
| 2 | 0 | round(range * 8/ elements + 0.5) | round(range * 40/ elements + 0.5) |
| 3 | 0 | round(range * 40/ elements + 0.5) | round(range * 2/ elements + 0.5) |
| 4 | 0 | round(range * 2/ elements + 0.5) | round(range * 44/ elements + 0.5) |
| 5 | 0 | round(range * 44/ elements + 0.5) | round(range * 10/ elements + 0.5) |
| 6 | 0 | round(range * 10/ elements + 0.5) | round(range * 42/ elements + 0.5) |
| 7 | 0 | round(range * 42/ elements + 0.5) | round(range * 48/ elements + 0.5) |

-continued

| Xvalue | Yvalue | RBA | G |
|---|---|---|---|
| 0 | 1 | round(range * 48/ elements + 0.5) | round(range * 16/ elements + 0.5) |
| 1 | 1 | round(range * 16/ elements + 0.5) | round(range * 56/ elements + 0.5) |
| 2 | 1 | round(range * 56/ elements + 0.5) | round(range * 24/ elements + 0.5) |
| 3 | 1 | round(range * 24/ elements + 0.5) | round(range * 50/ elements + 0.5) |
| 4 | 1 | round(range * 50/ elements + 0.5) | round(range * 18/ elements + 0.5) |
| 5 | 1 | round(range * 18/ elements + 0.5) | round(range * 58/ elements + 0.5) |
| 6 | 1 | round(range * 58/ elements + 0.5) | round(range * 26/ elements + 0.5) |
| 7 | 1 | round(range * 26/ elements + 0.5) | round(range * 12/ elements + 0.5) |
| 0 | 2 | round(range * 12/ elements + 0.5) | round(range * 44/ elements + 0.5) |
| 1 | 2 | round(range * 44/ elements + 0.5) | round(range * 4/ elements + 0.5) |
| 2 | 2 | round(range * 4/ elements + 0.5) | round(range * 46/ elements + 0.5) |
| 3 | 2 | round(range * 46/ elements + 0.5) | round(range * 14/ elements + 0.5) |
| 4 | 2 | round(range * 14/ elements + 0.5) | round(range * 46/ elements + 0.5) |
| 5 | 2 | round(range * 46/ elements + 0.5) | round(range * 6/ elements + 0.5) |
| 6 | 2 | round(range * 6/ elements + 0.5) | round(range * 38/ elements + 0.5) |
| 7 | 2 | round(range * 38/ elements + 0.5) | round(range * 60/ elements + 0.5) |
| 0 | 3 | round(range * 60/ elements + 0.5) | round(range * 28/ elements + 0.5) |
| 1 | 3 | round(range * 28/ elements + 0.5) | round(range * 52/ elements + 0.5) |
| 2 | 3 | round(range * 52/ elements + 0.5) | round(range * 20/ elements + 0.5) |
| 3 | 3 | round(range * 20/ elements + 0.5) | round(range * 62/ elements + 0.5) |
| 4 | 3 | round(range * 62/ elements + 0.5) | round(range * 30/ elements + 0.5) |
| 5 | 3 | round(range * 30/ elements + 0.5) | round(range * 54/ elements + 0.5) |
| 6 | 3 | round(range * 54/ elements + 0.5) | round(range * 22/ elements + 0.5) |
| 7 | 3 | round(range * 22/ elements + 0.5) | round(range * 3/ elements + 0.5) |
| 0 | 4 | round(range * 3/ elements + 0.5) | round(range * 35/ elements + 0.5) |
| 1 | 4 | round(range * 35/ elements + 0.5) | round(range * 11/ elements + 0.5) |
| 2 | 4 | round(range * 11/ elements + 0.5) | round(range * 43/ elements + 0.5) |
| 3 | 4 | round(range * 43/ elements + 0.5) | round(range * 1/ elements + 0.5) |
| 4 | 4 | round(range * 1/ elements + 0.5) | round(range * 33/ elements + 0.5) |
| 5 | 4 | round(range * 33/ elements + 0.5) | round(range * 9/ elements + 0.5) |
| 6 | 4 | round(range * 9/ elements + 0.5) | round(range * 41/ elements + 0.5) |
| 7 | 4 | round(range * 41/ elements + 0.5) | round(range * 51/ elements + 0.5) |
| 0 | 5 | round(range * 51/ elements + 0.5) | round(range * 19/ elements + 0.5) |
| 1 | 5 | round(range * 19/ elements + 0.5) | round(range * 59/ elements + 0.5) |
| 2 | 5 | round(range * 59/ elements + 0.5) | round(range * 27/ elements + 0.5) |
| 3 | 5 | round(range * 27/ elements + 0.5) | round(range * 49/ elements + 0.5) |
| 4 | 5 | round(range * 49/ elements + 0.5) | round(range * 17/ elements + 0.5) |
| 5 | 5 | round(range * 17/ elements + 0.5) | round(range * 57/ elements + 0.5) |
| 6 | 5 | round(range * 57/ elements + 0.5) | round(range * 25/ elements + 0.5) |
| 7 | 5 | round(range * 25/ elements + 0.5) | round(range * 15/ elements + 0.5) |
| 0 | 6 | round(range * 15/ elements + 0.5) | round(range * 47/ elements + 0.5) |
| 1 | 6 | round(range * 47/ elements + 0.5) | round(range * 7/ elements + 0.5) |
| 2 | 6 | round(range * 7/ elements + 0.5) | round(range * 39/ elements + 0.5) |
| 3 | 6 | round(range * 39/ elements + 0.5) | round(range * 13/ elements + 0.5) |
| 4 | 6 | round(range * 13/ elements + 0.5) | round(range * 45/ elements + 0.5) |
| 5 | 6 | round(range * 45/ elements + 0.5) | round(range * 5/ elements + 0.5) |
| 6 | 6 | round(range * 5/ elements + 0.5) | round(range * 37/ elements + 0.5) |
| 7 | 6 | round(range * 37/ elements + 0.5) | round(range * 63/ elements + 0.5) |
| 0 | 7 | round(range * 63/ elements + 0.5) | round(range * 31/ elements + 0.5) |
| 1 | 7 | round(range * 31/ elements + 0.5) | round(range * 55/ elements + 0.5) |
| 2 | 7 | round(range * 55/ elements + 0.5) | round(range * 23/ elements + 0.5) |
| 3 | 7 | round(range * 23/ elements + 0.5) | round(range * 61/ elements + 0.5) |
| 4 | 7 | round(range * 61/ elements + 0.5) | round(range * 29/ elements + 0.5) |
| 5 | 7 | round(range * 29/ elements + 0.5) | round(range * 53/ elements + 0.5) |
| 6 | 7 | round(range * 53/ elements + 0.5) | round(range * 21/ elements + 0.5) |
| 7 | 7 | round(range * 21/ elements + 0.5) | round(range * 0/ elements + 0.5) |

From the observation of the above-reported tables one can deduce that the n×n dither matrix for processing of the G channel has the same elements, i.e. the same threshold values, of the respective n×n dither matrix used for processing the RBA channels, however the elements of the dither matrix used for processing the G channel have, within said matrix, a different spatial distribution with respect the spatial distribution of said elements in the dither matrix used for processing the RBA channels.

It is also to be noticed that, in the above reported tables, all the elements of the dither matrices are expressed in parametric form, each of said elements (except for the element having the value equal to zero) being obtainable as a function of the following parameters: dimension of the dither matrix, number of the bits used for the input digital value (i.e. the number of bits which corresponds to the chromatic resolution of the digital image to be processed by means of the dithering) and number of the bits used for the output digital value (i.e. the number of bits which corresponds to the chromatic resolution of the digital image provided and output from the dithering).

Figure 4:
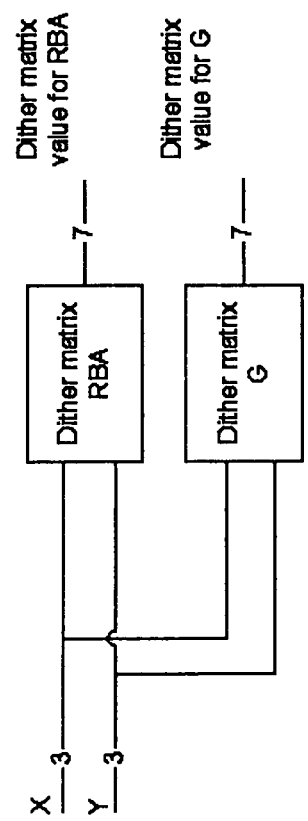

The selection of the threshold values, i.e. the values of the dither matrix with which the pixel intensity values of the various channels that make up the image are to be compared, is made in the manner explained hereinbelow with reference to FIG. 4.

The coordinates that define the position of a pixel of the image are indicated by X and Y. A threshold value of the matrix is selected by utilizing a binary number made up of the m least significant bits of the binary number that represents the position, where m depends on the dimensions of the employed dither matrix. For example, when X=110100
Y=110001
m=3 (8×8 dither matrix),
the last three bits of each coordinate,
x=100
y=001,
represent the coordinates of the threshold value of matrices DithermatrixRBA and DithermatrixG. The threshold values in this example are represented by a binary number (Dither matrix value for RBA, Dither matrix value for G) made up of seven bits at the very most.

When a 2×2 dither matrix is used, one bit is sufficient for the X-coordinates and one bit for the Y-coordinates to address the threshold value. For 3×3 and 4×4 dither matrices, on the other hand, two bits will be needed for the X-coordinates and two bits for the Y-coordinates.

Coming back to the block diagram of FIG. 3, the symbols there used have the following meanings:
>>i: displacement of i bits towards the right, i.e. removal of the least significant i bits
<<i: displacement of i bits towards the left, i.e. addition of i least significant bits equal to 0
>=: greater or equal to
!=: different from
DIFF: difference
COMP: comparison
MUX: multiplexing
4, 8, 12 on the connecting lines indicate the number of bits of the binary numbers transmitted on the lines
a and b: binary numbers constituting the inputs of the various functional blocks (in general different for each block).

For the purposes of better understanding the algorithm shown in FIG. 3 it may be useful to consider the various operations on the basis of the following example, in which in_value_r=10101110 and "Dither matrix value for RBA"=0111.

1. Displacement by four bits towards the left of the input value In_value_r=10101110
b=101011100000
2. Calculation b−a in DIFF1:
a=10101110
b=101011100000
b−a=101000110010
3. Displacement of b−a (result of operation 2) by eight bits towards the right: 1010.
4. Displacement by four bits towards the left of the result of equation 3:
b=10100000
and calculation of a−b (10101110−10100000) in DIFF2: new a at output: 1110.
5. Calculation a−b (1110−1010) in DIFF3:
new a at output from DIFF3: 0100.
6. Comparison between a at output from DIFF3 (0100) and "Dithermatrix value for RBA" (=0111) if greater or equal:
output from COMP=1
otherwise:
output from COMP=0
in this example: output from COMP=0
7. When the result of operation 3 (1010) is different from 1111 (equivalent to 15 in decimal notation):
result equal to 1
otherwise: result equal to 0.
This result controls the multiplexer MUX1 with the following logic:
when it is equal to 1, the result of operation 6 is chosen,
when it is equal to 0, the value 0 is chosen.

In this example the result is equal to 0.
The output of MUX1 controls the multiplexer MUX2.
8. Logic of MUX2:
incoming values:
selection 0: value resulting from operation 3 (1010)
selection 1: value resulting from operation 3 increased by one unit (1011);
the choice between these two values is made on the basis of the result of operation 7 (in this example equal to 0), so that at the output from MUX2 we have the value 1010
9. Logic of MUX3
incoming values:
selection 0: in_value_r displaced by four bits towards the right (1010)
selection 1: result of operation 8 (1010)
the choice between these two values is made on the basis of the value of Enable (example: Enable=1, Out_r=1010).

The "Dither matrix value for G" extracted from the dither matrix G is used for the G channel.

Figure 5:
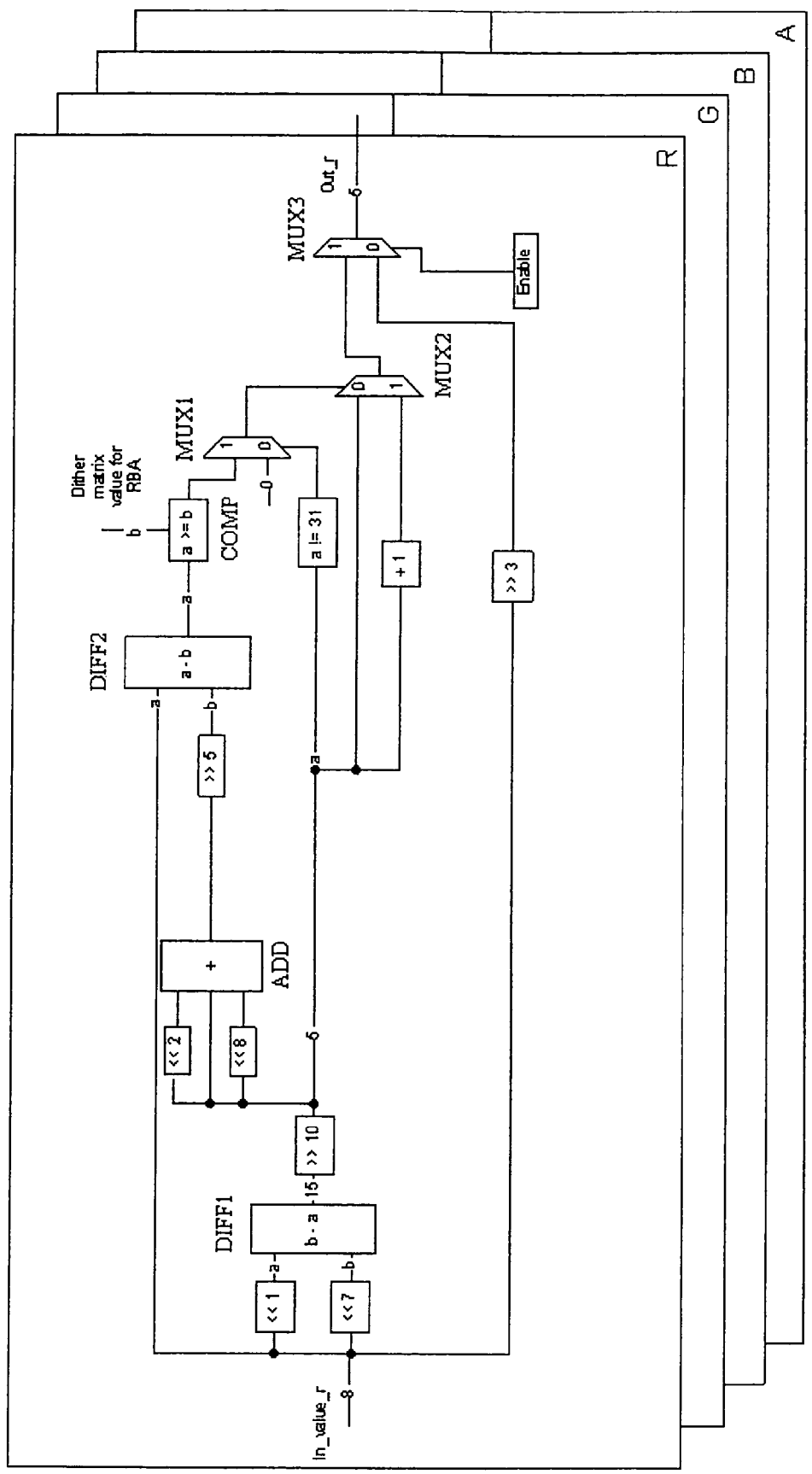

Let us now consider a second form of implementation of a method in accordance with an embodiment of the present invention illustrated by FIG. 5. In this case, once again, the image is constituted by four channels (RGBA) and the algorithm set out within the box in relation with channel R is executed for each of the channels. This time the algorithm carries out the ordered dithering of the image by converting the eight-bit intensity values, again indicated by in_value_r into five-bit intensity values, again indicated by Out_r.

One and the same dither matrix of n×n elements is used for processing the channels RBA, while another dither matrix of n×n elements is used for the channel G.

The notations and symbols indicated in FIG. 3 are re-employed with the same meanings in FIG. 5. FIG. 5 also contains the notation ADD, which indicates a sum.

In this case, once again, it may be helpful to consider the various operations in the form of a specific example in which in_value_r=10101110 and "Dither matrix value for RBA"=0111.

1. Calculation b−a
a=101011100 (obtained by displacing In_value_r by one bit towards the left)
b=1010111000000000 (obtained by displacing In_value_r by seven bits towards the left)
b−a=101010110100100 at the output of DIFF1.
2. Displacement of the output of DIFF1 by 10 bits towards the right:
result: 10101
3. Displacement by two bits to the left, displacement by eight bits to the left and sum in ADD:
10101+1010100+1010100000000=1010101101001.
4. Displacement of the output of ADD by five bits towards the right and calculation of a−b in DIFF2:
a=10101110
b=10101011
a−b=11
5. Comparison. When the output of DIFF2 is greater or equal to "Dither matrix value for RBA": result equal to 1, otherwise: result equal to 0.
In this example, output DIFF2=11 and "Dither matrix value for RBA"=0111, so that the result is equal to 0.
6. When the result of operation 2 is different from 11111 (equivalent to 31 in decimal notation):
result equal to 1, otherwise: result equal to 0.
In this example the result is equal to 1.
This result is used to control the multiplexer MUX1.
Logic of MUX1:

in the case in which the result of operation 6 is equal to one, the result of operation 5 is chosen.

In the case in which the result of operation 6 is equal to zero, the value 0 is chosen.

In this example the result of operation 6 is equal to 1, and therefore 0 will be chosen.

The output of MUX1 is used to control the multiplexer MUX2.

7. Logic of MUX2.
incoming values:
selection 0: result of operation 2 (10101)
selection 1: result of operation 2 increased by one unit (10110).

The choice between these two values is made on the basis of the result of operation 6 (in this example equal to 0), so that at the output from MUX2 we have the value 10101).

9. Logic of MUX3
incoming values:
selection 0: in_value_r displaced by three bits towards the right (10101)
selection 1: result of operation 7 (10101).

The choice between these two values is made on the basis of the value of Enable (example: Enable=1, Out_r=10101).

The "Dither matrix value for G" extracted from the dither matrix G is used for the G channel.

Figure 6:
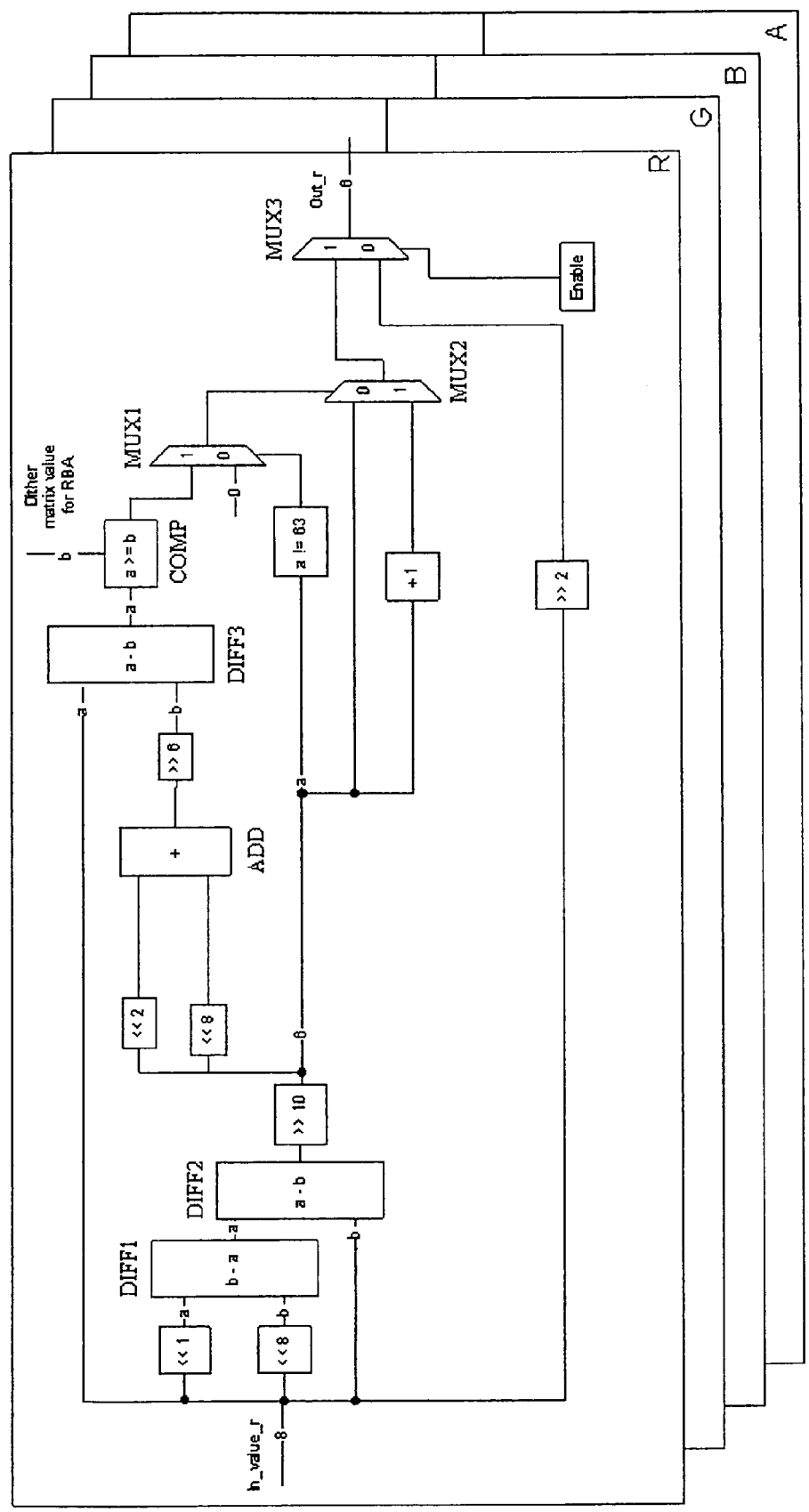

In a third form of implementation of a method in accordance with an embodiment of the present invention illustrated by FIG. 6 the image is likewise constituted by four channels (RGBA). The ordered dithering algorithm set out in the box relating to the channel R is executed for each channel. In this case the image made up of eight bits per channel is converted into a six-bit image per channel. One and the same dither matrix of n×n elements is used for the three channels RBA, while another dither matrix of n×n elements is used for the channel G.

The notations and symbols used in FIG. 6 are the same as those employed in FIG. 5.

The various operations relating to a specific example will now be described with reference to the channel R. Let us consider the case in which the input intensity value in_value_r=10101110 and the Dither-matrix value is equal to 0111.

1. Calculation b−a in DIFF1:
a=101011100 (obtained by displacing in_value_r by one bit to the left)
b=1010111000000000 (obtained by displacing in_value_r by eight bits to the left)
b−a=1010110010100100 at the output of DIFF1.

2. Calculation a−b in DIFF2:
a=1010110010100100
b=10101110
a−b=1010101111110110 at the output of DIFF2.

3. Displacement of the output of DIFF2 by ten bits towards the right:
result: 101010

4. Displacement by two bits towards the left and by eight bits towards the left of the result of the previous operation and sum result 1: 10101000
result 2: 10101000000000
sum: 10101010101000 at output of ADD.

5. Displacement of the output of ADD by six bits towards the right and calculation of a−b in DIFF3:
b=10101010
a=10101110
a−b=100 at the output of DIFF3.

6. Comparison
when the output of DIFF3 is greater or equal to the "Dither matrix value for RBA" (0111):
the result is equal to 1
otherwise the result is equal to 0.
In this example (100 smaller than 0111): result=0.

7. When the result of operation 3 is different from 111111 (equivalent to 63 in decimal notation):
the result is equal to 1
otherwise the result is equal to 0
in this example (101010!=11111): result equal to 1.

The result of this operation is used to control the multiplexer MUX 1.

Logic of MUX1:
in the case in which the result of operation 7 is equal to 1, the result of operation 6 is chosen,
in the case in which the result of operation 7 is equal to 0, the value 0 is chosen.

In this example the result of operation 7 is equal to 1, so that the choice falls on the value 0, which is the result of operation 6.

The output of MUX1 is then used to control the multiplexer MUX2.

8. Logic of MUX2 incoming values:
selection zero: result of operation 3 (101010)
selection 1: result of operation 3 increased by one unit (101011);
the choice between these two values is made on the basis of the result of operation 7 (in this example equal to 0), so that at the output from MUX2 we have the value 101010.

9. Logic of MUX3
incoming values:
selection 0: in_value_r displaced by two bits towards the right (101011)
selection 1: result of operation 8 (101010).

The choice between these two values is made on the basis of the value of Enable (example: Enable=1, Out_r=101010).

The "Dither matrix value for G" extracted from the dither matrix G is used for the G channel.

The three forms of implementation described above can be represented by a single layout (shown in FIG. 7) in which the various functional blocks are controlled by parameters that can assume different values as indicated in the table of FIG. 8. The shown layout refers to the algorithm for processing the channel R, but is also valid for the processing of the other channels, though with the sole variant that in the case of channel G it is used with "Dither matrix value for G" rather than "Dither matrix value for RBA".

Varying the parameters as shown in the table of FIG. 8, one obtains the algorithms represented in FIGS. 3, 5 and 6 relating to the conversions of an eight-bit input image into output images of, respectively, four, five and six bits.

The notations and symbols used are the same as for the implementation forms described above, with sole addition of an operator, indicated by ADD/DIFF, that carries out the function sum or difference in accordance with the value (+ or −) of a parameter ($C_3$).

Figure 7:
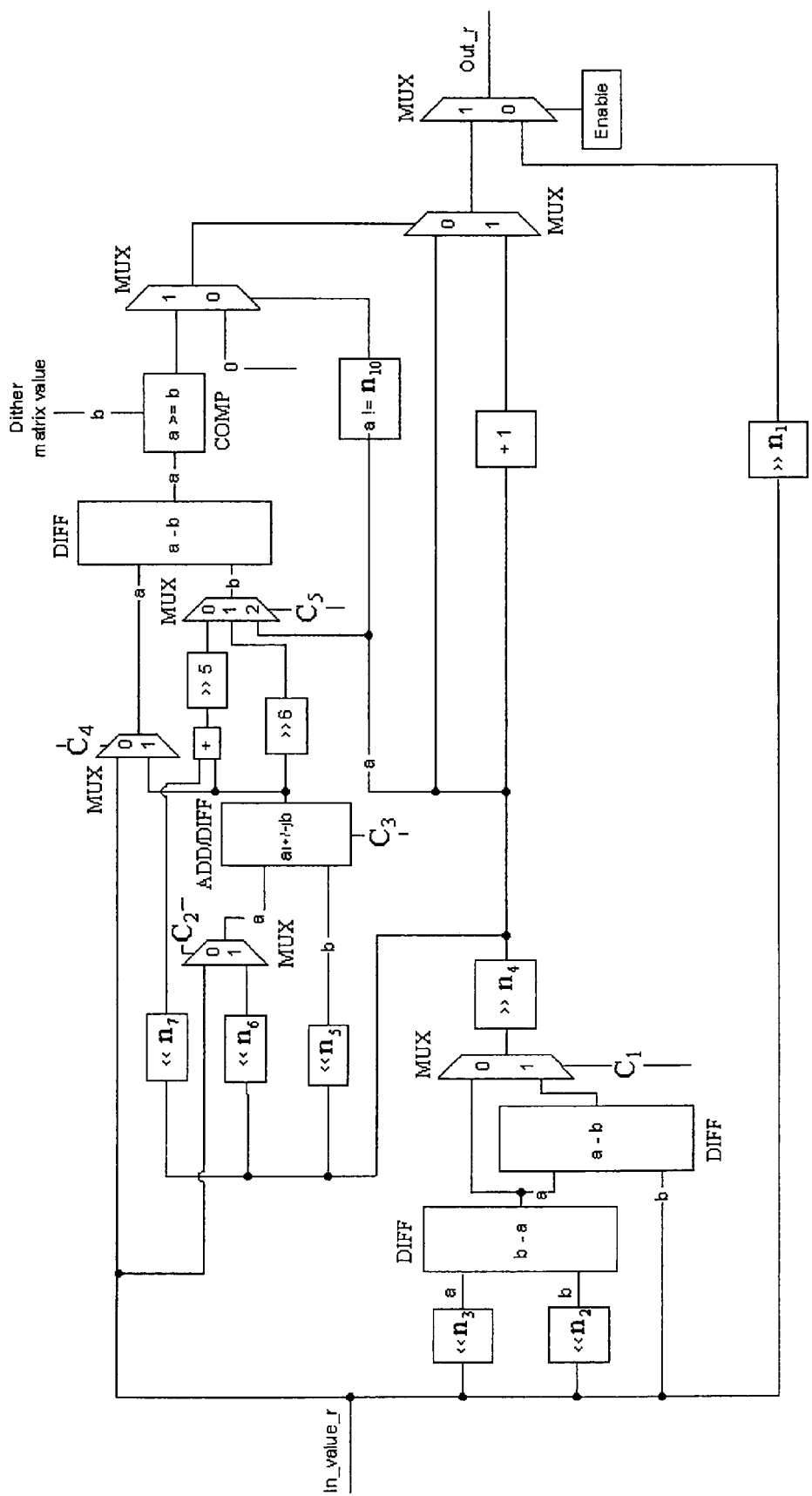
FIG. 7 is a block diagram that illustrates a method in accordance with an embodiment of the present invention.

As a general rule, the parameters may be chosen by means of heuristic methods by comparing the low-resolution image obtained by applying the algorithm of FIG. 7 with an equivalent low-resolution image obtained by applying a conventional ordered dithering method taken as a Fsample. In this phase, of course, a complex hardware system and/or a complex software has to be used. Nevertheless, once the parameters have been selected, the algorithm of FIG. 7 is more advantageous than its conventional counterpart, because it is based on simple operations ("displacements" to the right and to the left) that can be carried out at a very high speed and do not call for complex hardware systems or complex software.

From the foregoing it will be appreciated that, although specific embodiments of the invention have been described herein for purposes of illustration, various modifications may be made without deviating from the spirit and scope of the invention.

The invention claimed is:

1. An ordered dithering method for processing a starting image having a first chromatic resolution and formed by N×M pixels, for obtaining an output image having a second chromatic resolution, said second resolution being lower than said first chromatic resolution, said starting image being suitable for being decomposed in three color channels, respectively R (red), B (blue) and G (green), and a brightness channel (A), said method comprising the steps of:

predisposing a first and a second dither matrix, each of said matrices comprising a multiplicity of threshold values ordered in j rows and j columns, where j is smaller than both N and M, repeatedly applying the first dither matrix to the R, B and A channels of the starting image and the second dither matrix to the G channel of the starting image for comparing the value of each of the pixels that compose said channels with a selected respective threshold value belonging to the respective dither matrix;

wherein said first and second dither matrices comprise the same threshold values, said threshold values being arranged differently within said two matrices.

2. The ordered dithering method according to claim 1, wherein each of said threshold values of said first and second dither matrices can be expressed as a function of the following parameters: dimension of the dither matrix, number of bits defining the chromatic resolution of said starting image and number of bits defining the chromatic resolution of said output image.

3. The ordered dithering method according to claim 1, comprising a step of:

applying an algorithm of, calculating B1−A1, where A1 is obtained by displacing an input pixel value INV by N3 bits to the left, where INV represents a pixel value of a starting image to be processed, and where B1 is obtained by displacing the pixel value INV by N2 bits to the left;

calculating (B1−A1)−B1;

selecting either the value (B1−A1) or the value (B1−A1)−B1 in response to a value of a selection parameter C1, the selected value being provided as a value V1;

displacing the value V1 by N4 bits to the right to develop a value V2;

selecting either the value V2 or a value V2+1 in response to a selection parameter S1, the selected value being provided as a value V3;

determining the selection parameter S1 from the input pixel value INV, the value S2, and a dither matrix value corresponding to a threshold value selected from a dither matrix for the particular pixel value that is being processed;

displacing the value INV by N1 bits to the right to develop a value V4; and selecting an output pixel value OUT corresponding to the pixel value of an image being output, the output pixel value being either the value V3 or V4 in response to an enable parameter EN being active or inactive, respectively;

wherein the algorithm is applied to every pixel value of the channels of the starting image for obtaining the pixel values of respective channels of the output image;

and wherein C1 and N1-N4 are parameters that may be selected by means of predetermined criteria based on comparisons of the output image, obtained by means of the steps described above, with an equivalent image having the same chromatic resolution of said output image and being obtained by means of a sample method.

4. A method in accordance with claim 3, wherein determining the selection parameter S1 further comprises:

displacing the value V2 by N6 bits to the to the left to develop a value V5;

displacing the value V2 by N5 bits to the left to develop a value V6;

displacing the value V2 by N7 bits to the left to develop a value V7;

selecting one of the value V5 and the input pixel value INV, the selected value being provided as a value V8;

calculating a summation value (V8+V6) or a difference value (V8−V6) and providing the calculated value as a value V9, with either the summation or difference value being calculated in response to a parameter C3;

displacing the value V9 by 6 bits to the right to develop a value V10;

summing the value V7 and the value V9 to develop a value V11;

displacing the value V11 by 5 bits to the right to develop a value V12;

selecting one of the values V2, V10, and V12 in response to a parameter C5, the selected one of the value being provided as a value V13 selecting one of the input pixel value INV and the value V9 in response to a parameter C4, the selected value being provided as a value V14;

subtracting the value V13 from the value V14 to develop a value V15;

determining whether the value V15 is greater than or equal to the threshold value selected from the dither matrix and providing a value V16 having a first binary value when the V15 is greater than or equal to the threshold value and a second binary value otherwise;

determining whether the value V2 is different from a parameter N10 and developing value V17 having a first binary value when this is true and a second binary value otherwise;

selecting one of the value V17 and a predetermined binary logic level value in response to the value V17 and providing the selected value as the value S1; and wherein the C2-C5 and N5-N7 and N10 are parameters that may be selected in the same manner as parameters C1 and N1-N4.

5. A method in accordance with claim 4, wherein the parameters C1-C5 and N1-N7 and N10 assume the values indicated in the following table,

| Signal control | Signal value for case: 8 to 6 | Signal value for case: 8 to 5 | Signal value for case: 8 to 4 |
| --- | --- | --- | --- |
| C$_1$ | 1 | 0 | 0 |
| C$_2$ | 1 | 1 | 0 |
| C$_3$ | + | + | − |

-continued

| Signal control | Signal value for case: 8 to 6 | Signal value for case: 8 to 5 | Signal value for case: 8 to 4 |
|---|---|---|---|
| $C_4$ | 0 | 0 | 1 |
| $C_5$ | 1 | 0 | 2 |
| $n_1$ | 2 | 3 | 4 |
| $n_2$ | 8 | 7 | 4 |
| $n_3$ | 1 | 1 | 0 |
| $n_4$ | 10 | 10 | 8 |
| $n_5$ | 8 | 8 | 4 |
| $n_6$ | 2 | 0 | 0 |
| $n_7$ | 2 | 2 | 2 |
| $n_{10}$ | 63 | 31 | 15 | where "8 to 6", "8 to 5" and "8 to 4" indicate conversions of images constituted by eight-bit pixels into, respectively, six-bit, five-bit and four-bit images, where the symbols + or − associated with the parameter $C_3$ indicate that the operation carried out in the block to which the parameter $C_3$ is applied is, respectively, a sum or a difference.

6. The ordered dithering method according to claim 1, wherein for each pixel having coordinates X, Y in the starting image, said respective threshold value is selected from one of said matrices by using the m less-significant bits that can be obtained by representing said X and Y coordinates in corresponding digital values, wherein m is an integer depending from the dimension of said one of said dither matrices.

7. A method for processing a starting image having a first chromatic resolution and formed by N×M pixels to generate an output image having a second chromatic resolution, the second chromatic resolution being lower than said first chromatic resolution, the method comprising:
generating a first dither matrix including a plurality of threshold values;
generating a second dither matrix including the plurality of threshold values, the plurality of threshold values being arranged differently within the second dither matrix than within the first dither matrix, and arranged such that the second dither matrix is not the additive inverse of the first dither matrix;
repeatedly applying the first dither matrix to selected groups of pixels in the starting image by comparing a value of each of the pixels in the group to a corresponding threshold value in the first dither matrix, wherein the application of the matrix to each selected group of pixels generates corresponding groups of pixels in the output image; and
repeatedly applying the second dither matrix to at least one selected group of pixels in the starting image by comparing a value of each of the pixels in the group to a corresponding threshold value in the second dither matrix, wherein the application of the matrix to each selected group of pixels generates corresponding groups of pixels in the output image.

8. The method of claim 7 wherein generating the first and second dither matrix further comprises:
generating for each matrix the corresponding plurality of threshold values;
storing these threshold values in memory; and
retrieving these stored values from memory when the matrices are applied to the groups of pixels.

9. The method of claim 7 wherein generating the first and second dither matrix further comprises sequentially generating the threshold values as the threshold values are required when the matrices are being applied to the groups of pixels.

10. The method of claim 7 wherein each of the dither matrices comprises an N×N matrix containing $N^2$ threshold values, and wherein applying the dither matrix to selected groups of pixels comprises repeatedly comparing the N threshold values to sets of N pixels within the selected group of pixels.

11. The method of claim 7 wherein each pixel in the starting image includes 8 bits of data and wherein each pixel in the output image includes either 6, 5, or 4 bits of data.

12. A method for processing a starting image having a first chromatic resolution and formed by N×M pixels to generate an output image having a second chromatic resolution, the second chromatic resolution being lower than said first chromatic resolution, the method comprising:
generating a first dither matrix including a plurality of first threshold values;
generating a second dither matrix including a plurality of second threshold values, the second threshold values being the same as the first threshold values but the second threshold values being arranged differently within the second dither matrix than the first threshold values are arranged within the first dither matrix;
repeatedly applying the first dither matrix to selected groups of pixels in the starting image by comparing a value of each of the pixels in the group to a corresponding threshold value in the first dither matrix, wherein the application of the matrix to each selected group of pixels generates corresponding groups of pixels in the output image; and
repeatedly applying the second dither matrix to at least one selected group of pixels in the starting image by comparing a value of each of the pixels in the group to a corresponding threshold value in the second dither matrix, wherein the application of the matrix to each selected group of pixels generates corresponding groups of pixels in the output image;
wherein the first dither matrix is applied to red, blue, and luminosity groups of pixels in the starting image and wherein the second dither matrix is applied to green pixels in the starting image.

13. A computer-readable medium storing a dither matrix data structure for application to digital image data, the dither matrix data structure comprising:
a table including sets of X and Y values, each set of X and Y values pointing to an associated threshold value given by the formula Round (Range *N/elements+0.5);
wherein Range=$2^{bitin-bitout}-1$ where bitin represents the number of input bits for each input pixel in the image data and bitout represents the number of output bits for each pixel in an output image generated by application of the dither matrix data structure to the input pixels in the image data;
wherein elements=$dim\_Mtx^2$ where dim_Mtx represents the dimension of the dither matrix);
wherein Round represents an operator who rounds off the expression in parentheses to the nearest whole number; and
wherein the parameter N is one of the whole numbers between zero and the dimension of the dither matrix $dim_{13}$ Mtx, with the values for N associated with each set of X and Y values being a function of the dimension of the dither matrix dim_Mtx.

14. The computer-readable medium of claim 13 wherein the dimension of the dither matrix comprises one of 2,3, 4, or 8.

15. The computer-readable medium of claim 13 wherein bitin equals 8 and wherein bitout equals one of 6, 5, or 4.

16. A method for processing a starting image having a first chromatic resolution and formed by N×M pixels to generate an output image having a second chromatic resolution, the second chromatic resolution being lower than said first chromatic resolution and the starting image including red, green, blue, and luminance groups of pixels, the method comprising:
  generating a first dither matrix; including a plurality of first threshold values;
  generating a second dither matrix including a plurality of second threshold values arranged differently than the first threshold values in the first dithering matrix;
  repeatedly applying the first dither matrix to the red, blue, and luminance groups of pixels in the starting image; and
  repeatedly applying the second dither matrix to the green group of pixels in the starting image.

17. The method of claim 16 wherein generating the first and second dither matrix further comprises:
  generating for each matrix the corresponding plurality of threshold values;
  storing these threshold values in memory; and
  retrieving these stored values from memory when the matrices are applied to the groups of pixels.

18. The method of claim 16 wherein generating the first and second dither matrix further comprises sequentially generating the threshold values as the threshold values are required when the matrices are being applied to the groups of pixels.

19. The method of claim 16 wherein each of the dither matrices comprises an N×N matrix containing $N^2$ threshold values, and wherein applying each dither matrix to the groups of pixels comprises repeatedly comparing the N threshold values to a set of N pixels within a given group of pixels.

20. The method of claim 16 wherein each pixel in the starting image includes 8 bits of data and wherein each pixel in the output image includes either 6, 5, or 4 bits of data.

* * * * *

UNITED STATES PATENT AND TRADEMARK OFFICE
CERTIFICATE OF CORRECTION

PATENT NO.        : 7,623,270 B2
APPLICATION NO.   : 11/145021
DATED             : November 24, 2009
INVENTOR(S)       : Pier Luigi Gardella et al.

It is certified that error appears in the above-identified patent and that said Letters Patent is hereby corrected as shown below:

Claim 13, Column 14, Line 60 of the patent should read "dim_Mtx, with the values for N associated with each set"

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,623,270 B2  Page 1 of 1
APPLICATION NO. : 11/145021
DATED : November 24, 2009
INVENTOR(S) : Gardella et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Fourteenth Day of December, 2010

David J. Kappos
*Director of the United States Patent and Trademark Office*